United States Patent [19]
Klassen et al.

[11] Patent Number: 5,621,546
[45] Date of Patent: Apr. 15, 1997

[54] METHOD AND APPARATUS FOR VECTOR ERROR DIFFUSION WITH OUTPUT COLOR CONTROL

[75] Inventors: Robert V. Klassen; Reiner Eschbach, both of Webster, N.Y.; Krishna A. Bharat, Atlanta, Ga.

[73] Assignee: Xerox Corporation, Stamford, Conn.

[21] Appl. No.: 144,478

[22] Filed: Nov. 2, 1993

[51] Int. Cl.$^6$ ............................................. H04N 1/40
[52] U.S. Cl. ................................. 358/536; 358/518
[58] Field of Search ..................... 358/296, 298, 358/502, 533–536, 456–458, 518

[56] References Cited

U.S. PATENT DOCUMENTS

| | | | |
|---|---|---|---|
| 4,256,401 | 3/1981 | Fujimura et al. | 355/14 E |
| 4,625,222 | 11/1986 | Bassetti | 346/160 |
| 4,672,463 | 6/1987 | Tomohisa et al. | 358/284 |
| 4,680,645 | 7/1987 | Dispoto et al. | 358/298 |
| 4,693,593 | 9/1987 | Gerger | 355/14 CH |
| 4,700,229 | 10/1987 | Herrmann et al. | 358/166 |
| 4,709,250 | 11/1987 | Takeuchi | 346/160 |
| 4,724,461 | 2/1988 | Rushing | 355/14 P |
| 4,930,018 | 5/1990 | Chan et al. | 358/298 |
| 5,040,128 | 8/1991 | Yamaguchi | 364/518 |
| 5,045,952 | 9/1991 | Eschbach | 358/447 |
| 5,055,942 | 10/1991 | Levien | 358/456 |
| 5,497,180 | 3/1996 | Kawakami et al. | 347/131 |

FOREIGN PATENT DOCUMENTS

91/06174  5/1991  WIPO .

OTHER PUBLICATIONS

Dennis Venable, Judy Stinehour, Paul Roetling; "Selection and Use of Small Color Sets for Pictorial Display"; Proceeding of the S.I.D. 1990; pp. 90–92.

Robert W. Floyd and Louis Steinberg; "An Adaptive Algorithm for Spatial Greyscale"; Proceeding of the S.I.D., vol. 17/2, 1976; pp. 75–77.

Knox and Eschbach; "Threshold Modulation in Error Diffusion;" *Journal of Electronic Imaging*, vol. 2(3), Jul. 1993, pp. 185–192.

Jarvis, Judice and Ninke; "A Survey of Techniques for Display of Continuous–Tone Pictures on Bilevel Displays;" *Computer Graphics and Image Processing 5*; pp. 13–40.

Stucki; "Image Processing for Document Reproduction;" *Advances in Digital Image Processing*; pp. 177–218.

Fan; "A Simple Modification of Error Diffusion Weights;" *Proceedings of the IS&T 46th Annual Conference* (1993); pp. 113–114.

Cole; "Naive Halftoning;" *Proceedings of CGI '90*; pp. 203–222.

Wyvill and McNaughton; "Three Plus Five Makes Eight: A Simplified Approach to Halftoning;" *Proceedings of CGI '91*; pp. 379–394.

Billotet–Hoffmann and Bryngdahl; "On the Error Diffusion Technique for Electronic Halftoning;" *Proceedings of the SID*, vol. 24/3, 1983, pp. 253–258.

Miller, Sullivan; "Color Halftoning Using Error Diffusion and Human Visual System Model;" *Proc. IS&T Annual Meeting*, pp. 149–152.

Primary Examiner—Stephen Brinich
Attorney, Agent, or Firm—Oliff & Berridge

[57] ABSTRACT

A method and apparatus perform vector error diffusion and result in reduced graininess of a color halftone image representing a continuous tone image. The method controls the output colors while reducing the visibility of the error diffusion pattern inherent in forming a bilevel image. Specifically, the method involves influencing the dot pattern correlation using vector error diffusion and takes into account the effects caused by the interactions of dot patters for all of the different color components.

32 Claims, 3 Drawing Sheets

| Pixel Number | 1 | 2 | 3 | 4 | 5 | 6 | 7 | 8 | 9 |
|---|---|---|---|---|---|---|---|---|---|
| Input | 3 | 3 | 3 | 3 | 3 | 3 | 3 | 3 | 3 |
| Modified Input | 3 | 6 | -1 | 2 | 5 | -2 | 1 | 4 | 7 |
| Output | 0 | 10 | 0 | 0 | 10 | 0 | 0 | 0 | 10 |
| Error | 3 | -4 | -1 | 2 | -5 | -2 | 1 | 4 | -3 |

METHOD AND APPARATUS FOR VECTOR ERROR DIFFUSION WITH OUTPUT COLOR CONTROL

BACKGROUND OF THE INVENTION

1. Field of the Invention

The invention relates to an apparatus and a method for controlling colors printed by a printer or displayed on a monitor to reduce the visibility of error diffusion dot patterns, and more particularly, to an apparatus and method for performing vector error diffusion with output color control.

2. Description of the Related Art

Reproduction and display of continuous tone images on color monitors and color printers using spatial grayscale or halftoning techniques is well known. However, the resulting halftone images display various amounts or levels of "graininess" resulting from error inherent in the halftoning process.

Digital halftoning is the process of converting a continuous tone image to bi-level. Many output devices, including many printers and some CRT (cathode ray tube) and LCD (liquid crystal display) based devices are intrinsically bi-level, that is, the process can only print or display a dot or no dot. Thus, a variety of geometrical patterns are created such that a group of dots and blank areas represent the continuous tone image as closely as possible. Because the halftoned image is only an approximate representation of the continuous tone image, there are differences between the continuous tone image and the halftone image. Those areas of the halftone pattern that do not match the original image are noise or error. An objective of much research in digital halftoning is reducing the amount of visible noise.

Digital halftoning can be classified into two classes: "conventional, passive halftoning" and "active halftoning;" with error diffusion being a widespread method of choice in the latter category. Conventional passive halftoning (discussed first) yields an appearance that is similar to that provided by classical analogue processes developed before digital techniques were available; it is most appropriate for devices that cannot display isolated pixels. Error diffusion produces an image appearance more like that created by the pointillist painters at around the end of the 19th century. It is most appropriate for devices that can display isolated pixels. Error diffusion tends to have noise at higher, and hence less visible spatial frequencies, often resulting in a more pleasing appearance, see for instance: "Threshold Modulation in Error Diffusion," by K. T. Knox and R. Eschbach, Journal of Electronic Imaging 3, pp. 185–192 (1993) and the references cited therein.

Several attempts have been made to reduce the sensitivity to process noise and maintain the appearance of the tonal gradation of the continuous tone image for conventional halftoning. For example, U.S. Pat. No. 4,625,222 to Bassetit et al. discloses a print enhancement control system for an electrostatic copier wherein control logic circuitry processes a set of image altering parameters to improve image production quality. These parameters have fixed or predetermined values and improve image quality by modifying modulated gray scale signals.

U.S. Pat. No. 4,700,229 to Hermann et al. discloses an image enhancement circuit which converts a low quality image signal into a high quality image signal by modifying the binary representation of a picture. Image enhancement is accomplished by multiplying a series of error difference signals by a series of weighting factors which produce clearer images by improving apparent picture resolution.

U.S. Pat. No. 4,672,463 to Tomohisa et al. discloses a method of improving image quality within an electrostatic reproduction machine wherein the sharpness of an image is improved based on the value of an image sharpness control parameter that has been calculated by examining the copy quality of an original.

U.S. Pat. No. 4,709,250 to Takeuchi discloses an image forming apparatus which improves the halftone image quality of an original. The pulse width of a reference control signal controls and improves image quality in response to detected image density signals.

U.S. Pat. No. 4,724,461 to Rushing discloses an image improving process control for an electrostatic copying machine which maintains high image quality by adjusting a set of process control parameters.

U.S. Pat. No. 4,256,401 to Fujimura et al. discloses an image density adjustment method wherein a predetermined image density level within an electrostatic copying machine is maintained at the standard density by a varying set of input control parameters.

U.S. Pat. No. 4,693,593 to Gerger discloses a method of improving the image quality by controlling a single process parameter in response to changes in sensitometeric characteristics of an image transfer member.

As mentioned above, another way of converting from continuous tone to a bi-level representation is error diffusion as disclosed in an article entitled "An Adaptive Algorithm for Spatial Greyscale" by Robert W. Floyd and Louis Steinberg, Proc. Soc. Inf. Disp. 17, 75–77 (1976). The process of error diffusion involves an algorithm which determines whether or not to print a dot at a certain location based on a comparison of the continuous tone data with a threshold value. Gray levels above a chosen threshold are assigned a dot to be printed and those below the threshold are not assigned a dot to be printed. If the threshold corresponds to midway between black and white, the method always chooses the closer of black and white. The inherent error resulting from such a choice is propagated in specified amounts to adjacent picture elements or pixels not yet considered to change the pixels prior to thresholding. This method produces a more accurate representation of a gray tone over a small area encompassing several dots than conventional halftoning. Hence, the error in the intensity of the digital image is diffused and, on average, zero.

The fraction of the error added to each neighhour depends on a set of weights, the total error being multiplied by the weight corresponding to a given neighhour and then added to the value of that neighhour. The choice of weight can greatly affect the image quality, and much has been said about weights appropriate for giving pleasing results. Three examples of weights other than those in the original Floyd and Steinberg algorithm may be found in papers by Jarvis, Judice, and Ninkey ("A Survey of Techniques for Display of Continuous-Tone Pictures on Bilevel Displays", Computer Graphics and Image Processing, 5, pp. 13–40, 1976), Stucki, ("Image Processing for Document Reproduction", Advances in Digital Image Processing, pp. 177–218, New York, Plenum, 1979), and Fan, ("A Simple Modification of Error Diffusion Weights", Proceedings of the IS&T 46th Annual Conference, pp. 113–114, Boston 1993).

Other attempts at reducing the patterns visible include changing the order in which pixels are considered. This can be as simple as changing direction on each scanline, as suggested by Floyd and Steinberg in their original article, or it can involve following a complicated curve. The latter method has been described in various forms including papers by Cole ("Naive Halftoning", Proceedings of CGI'90, Springer-Verlag, pp. 203–222), and Wyviil and McNaughton ("Three Plus Five Makes Eight: A Simplified Approach to Halftoning", Proceedings of CGI'91, Springer Verlag, pp. 379–394).

A variation of the Floyd and Steinberg error diffusion algorithm involves using a varying threshold to determine whether to print or display a dot. Examples of these varying threshold algorithms are: C. Billotet-Hoffmann and O. Bryngdahl, "On the Error Diffusion Technique for Electronic Halftoning", Proc. Soc. Inf. Disp. 24, pp. 253–258 (1983), in which a dither pattern was used as a threshold; U.S. Pat. No. 5,045,952 to Eschbach in which a function of the input signal was used as the threshold; and U.S. Pat. No. 5,055,942 to Levien in which a function of the binary output was used as the threshold.

Other known processes for performing error diffusion of color images include prior art devices that separately diffuse the error associated with each color. For example, in performing error diffusion of an RGB image, the prior art algorithms separately diffuse red while ignoring green and blue. Such an algorithm does not consider the effects of interactions between dot patterns of different color components comprising a color image. Other prior art algorithms perform separate error diffusion for each color of a RGB image but also perform color conversion from RGB to CMYK.

What is known as vector error diffusion was described in a paper by Dennis Venable, Judy Stinehour and Paul Roetling ("Selection and Use of Small Color Sets for Pictorial Display", Proc IS&T Annual Meeting, Rochester 1990) and in a paper by R. Miller and J. Sullivan ("Color Halftoning Using Error Diffusion and a Human Visual System Model", Proc IS&T Annual Meeting, Rochester 1990). In vector error diffusion colors are treated as points in a three dimensional space, with the colors printable or displayable at a given pixel discrete locations within that space. When a continuous tone color is to be displayed, the closest displayable color is selected, and the error is calculated as a vector in color space. Here, the "closeness" might be the simple distance in color space or a weighted distance based on the human visual model. The vector is the difference between the desired color and the available color. The (vector) error is then diffused in the same way as in normal error diffusion.

SUMMARY OF THE INVENTION

It is an object of the invention to provide a modified vector error diffusion algorithm producing lower visibility of the error diffusion dot pattern.

It is a further object of the invention to modify existing error diffusion algorithms to take into account certain properties of the human visual system.

It is a further object of the invention to provide a method and apparatus for influencing dot pattern correlations using a modified vector error diffusion algorithm.

It is also an object of the invention to provide a method and apparatus for improving color output by taking into account effects of interactions between dot patterns of different color components comprising a color image.

It is a further object of the invention to provide a method and apparatus for reducing the visibility of error diffusion dot patterns by reducing luminanee variation and increasing pattern frequency.

It is a further object of the invention to provide a method and apparatus for improving color output by taking into account effects of toner coverage and ink coverage for an individual color pixel.

To achieve the above objects, the invention provides a method and apparatus for influencing dot pattern correlations using vector error diffusion. The most common and simple ways to perform error diffusion of color images are to treat each color component individually or treat each color as a quantity in a 3-dimensional space and apply a vector error diffusion to that quantity. However, the invention modifies these approaches by treating all of the colors together and modifying the color output by taking into account the effects caused by interactions of dot patterns for each of the colors in the color image.

The invention recognizes the inherent interactions between each color component of each pixel of a color image and the inherent properties of the human visual system. The invention uses these known interactions and properties and modifies known error diffusion techniques to reduce output image graininess without the need to include an explicit model of the human visual system. Specifically, the invention modifies the process for deciding whether to turn on a pixel and modifying the process for deciding which color pixel to output.

The invention seeks to print or display single pixels with good inter-separation registration while 1) minimizing the number of black and white pixels output; 2) minimizing the number of secondary colors printed if no black and white pixels are printed; and 3) dispersing the pixels printed or displayed to increase the dominant spatial frequency. By increasing the spatial frequency, there is less visible noise produced; by avoiding black and secondary colors, there is less contrast between pixels that are printed and those that are not. Because visibility of noise is less at high frequencies and low contrast levels, the visibility of noise or graininess is substantially reduced.

BRIEF DESCRIPTION OF THE DRAWINGS

These and other aspects and advantages of the invention will become apparent from the following detailed description of preferred embodiments when taken in conjunction with the accompanying drawings, in which.

DETAILED DESCRIPTION OF PREFERRED EMBODIMENTS

The invention provides a modified vector error diffusion algorithm that takes into account the effects of interactions of the dot patterns for the different color components in a color continuous tone image to be printed by a printer or displayed by a color display monitor. The apparatus and method reduce the luminance variation and increase the pattern frequency by influencing the number of separations used in local regions of the output image.

The invention recognizes that when a white space is located next to a black pixel, there is a large contrast between white and black. Thus, a high contrast transition is introduced which is often perceived as disturbing noise. Further, there are also other combinations of colors that, when located adjacent to each other, contribute to high contrast and high noise. The method and apparatus of the invention lowers the visibility of this contrast by substituting colors having lower contrast and printing or displaying these colors next to each other. For example, instead of having black dots that are turned on or printed infrequently, cyan, magenta and yellow dots are turned on or printed frequently. This decreases the contrast and increases the spatial frequency. Thus, the noise pattern is far less visible.

Another example is when a Cyan-Red-White combination of three pixels is required. In the prior art, a Cyan pixel is printed first. Then a Red pixel, which is produced with a Magenta pixel printed on top of a Yellow pixel, are printed. Finally a pixel is left blank. The invention diffuses this combination and prints a Cyan pixel, a Magenta pixel, and a Yellow pixel combination. This decreases the contrast and spreads out the error diffusion. A smoother gray image results with no overlapping pixels.

Figure 1:
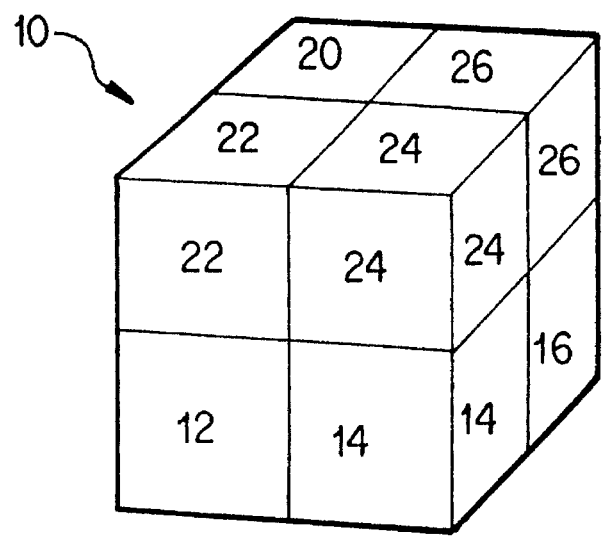
FIG. 1 depicts a conventional color cube, divided into eight subcubes containing points that are closest to each of the eight vertices of the color cube.

Referring to FIG. 1, a conventional color cube 10 is shown. The colors in the cube are: white 12; magenta 14; red 16; yellow 18 (back-left color block is hidden); green 20; cyan 22; blue 24; and black 26. In a color printer, the three inks used are generally cyan/magenta/yellow. Some printers use a fourth ink, black, in order to conserve the amount of ink printed. Color monitors use red, green and blue phosphors.

Figure 2:
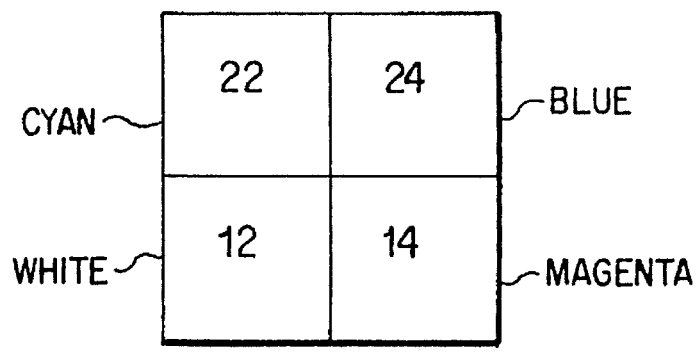
FIG. 2 shows a cross section of the same color cube, showing the white, cyan, magenta and blue points in the cube and threshold boundaries that determine the selection of the output colors.

As shown in FIG. 2, a cross section of the color cube 10 shows a four states consisting of white 12, magenta 14, cyan 22 and blue 24. The boundaries inside the cross section outline the regions for which all colors contained within such regions are closer to the corresponding corners of the cube than to any other corner. For example, if the input color is a light blue with a luminance range of 51–100%, the printer will print a white pixel (the color begins in the quadrant marked "white") and then will oscillate between white and blue in the appropriate amount (after errors are diffused, the colors will alternately fall into the blue quadrant 24 and the white quadrant 12). If the input color is a dark blue with a luminance range of 0%–49%, then a blue pixel will be printed first followed by the oscillation of white and blue pixels in the appropriate combination. The oscillation between white and blue causes a large variation in luminance and, for the case of an ink jet printer representing "blue" as a combination of "cyan" and "magenta", also in the ink coverage.

Figure 3:
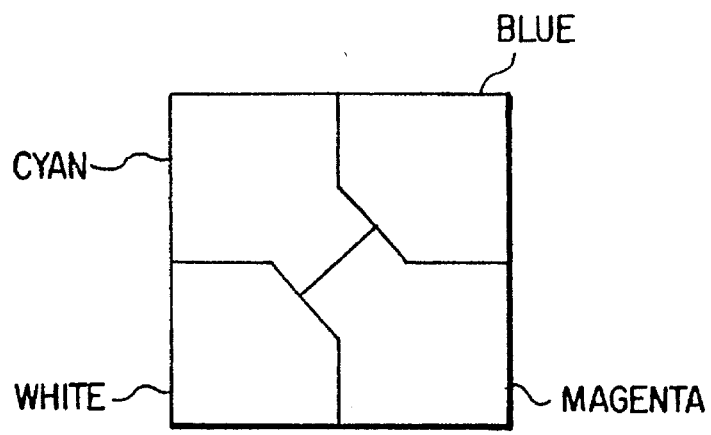
FIG. 3 shows a cross section of a distorted color space as used for vector error diffusion for determining output color in the invention, with threshold boundaries that determine the selection of the output color —the closest color in the distorted space.

The invention uses a distorted color cube, a possible cross section of which is shown in FIG. 3. Again, the boundaries shown divide regions considered closer to the corresponding color. The distance measure used to find the closest vertex in the cube is distorted to take into account the interactions between the colors. Use of this distorted color cube reduces the noise and increases the spatial frequency by favouring the selection of primary colors over secondaries, white and black. This is done by arranging that colors not favoured are further away from most colors in the cube than are favoured colors. This can be achieved by changing thresholds used to select the closest color or by changing the method used to compute a distance.

For example, if a 50% blue pixel is required, the conventional method would alternate between white (no color printed) and blue pixels. With the invention, however, the first pixel is represented by cyan (assuming cyan is preferred over magenta). The succeeding pixels are printed using a preferred alternation between cyan and magenta. Because the region of colors considered closest to blue is smaller than the regions of colors considered closest to cyan or magenta, a large range of light blues can be printed using cyan and magenta, with some white pixels interspersed. This is advantageous because of the reduction in contrast between these colors against each other and against white, compared to the contrast between white and blue.

One preferred embodiment measures the distance between the position in the color cube of the color required and the vertices of each of the colors in the color cube 10. The smallest distance is used as the color to print. With the distorted color cube, the coordinates of the vertices can be changed to prevent selecting undesirable colors such as black, white, red, green and blue.

One method to represent the distorted color cube is to modify the distances according to several penalties. The penalty assigned to the distance for each color can be determined as a function of the ink coverage and/or a function of the luminance of the output state. The output pixel color is then selected by picking the smallest (modified) distance for all of the colors. These predetermined penalties can be stored in a look-up table. Similarly the closest color can be stored in a look-up table.

If a reduction in luminance variation is desired, one might have the penalties P as follows:

$$P_{cyan} = P_{magenta} = P_{red} = P_{green} < P_{white} = P_{yellow} = P_{blue} = P_{black}.$$

Therefore, cyan/magenta would be chosen over white/blue because the penalties are less for the former colors (and hence their modified distances are less).

A system to maintain ink coverage with an apparatus using three color inks might assign the following penalties:

$$P_{cyan} = P_{magenta} = P_{yellow} < P_{white} = P_{red} = P_{green} = P_{blue} < P_{black}.$$

A black pixel requires all three colors to be printed in the same pixel space. Therefore, black has a high penalty because it is less desirable due to the increase in ink consumption.

It is a property of error diffusion that pixels printed tend to be spread apart. If a pixel has been set to a color, the error will be represented by a vector away from that color (possibly, but unlikely an error of 0 length). As a result the modified input value will, for nearby neighbours, move away from the color just printed, making it unlikely for a second pixel of the same color to be printed.

Figures 4, 6:
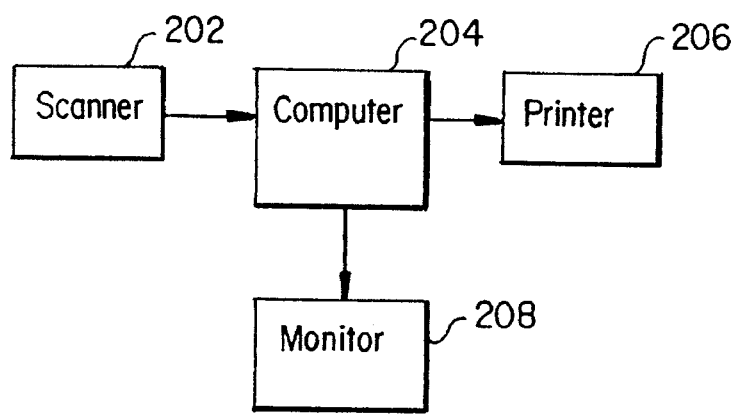
FIG. 4 shows the effect of setting an output pixel on a modified input value in the method of the invention.
FIG. 6 shows a device for using the method.

An example of this is shown in FIG. 4, which illustrates 1 dimensional error diffusion. Two dimensional error diffusion behaves in much the same way but is more difficult to illustrate. Assume that each pixel 1–9 has an input value of 3. When the modified input value reaches five, a pixel is printed. The pixel printed has a value of ten. The error is then calculated and diffused to the next pixel (assume all of the error is diffused to the same neighbour). For example, pixel one has an input value of three. Assuming that there is no diffused error from the preceding pixel, the modified input is also three. The modified input is less than the threshold value, therefore no pixel is printed and the output is zero.

The diffused error is now three. The modified input of pixel two is calculated by adding the input value of three and the error diffused from the previous pixel. Therefore, the modified input is six which exceeds the threshold value. A pixel is printed which forces the output to ten. The error is the modified input value minus the output value, therefore the error diffused is negative four. The modified input of pixel three is negative one. Therefore, the output is zero because the modified input does not exceed the threshold value. The error diffused is negative one and is diffused to pixel 4. After the process is completed, only pixels two, five and nine are printed.

In FIG. 4, two cases are marked where the setting of a pixel (output=10) reduces the modified input value. This effect is used to increase the separation of pixels set and, and hence reduce the dominant spatial frequency of the image: using error diffusion to decide when to set a pixel essentially disperses the pixels set.

By using the distorted color cube of the invention as described above, there is a reduction in the secondary and tertiary colors. Thus, a blue-white-blue-white pattern will be replaced by a preferred cyan- magenta-cyan-magenta pattern. However, a blue-white-white-white pattern will still result in a non-optimal cyan-magenta-white-white pattern. A modification of the method as already described provides the desired cyan-white-magenta-white pattern, resulting in an increase in the dominant spatial frequency of the output image. The method involves assigning a value to each color printed, i.e. Cyan, Yellow and Magenta. To determine the total amount of ink required for a particular dot, the sum of the values is calculated. Thus, the total amount of ink of the set of colors for each dot is computed instead of merely performing color conversion. Then, every time the total amount of ink required exceeds a predetermined threshold, it is determined that a pixel is to be printed. Standard (non-vector) error diffusion is used to compute the total amount of ink required. Thus at each pixel, the total amount is thresholded, a pixel may or may not be printed, and the error in the total amount of ink is diffused to neighbouring pixels' total ink requirements.

Specifically:

pixel(n)=ON, if cyan+magenta+yellow>threshold, where ON does not specify the pixel color, but only the presence of a pixel and the pixel color is determined by using the distorted color cube described above.

Thus, the invention determines when to turn on a pixel and what color that pixel should be to best reduce the luminance and decrease the visibility of the error pattern.

Figure 5:
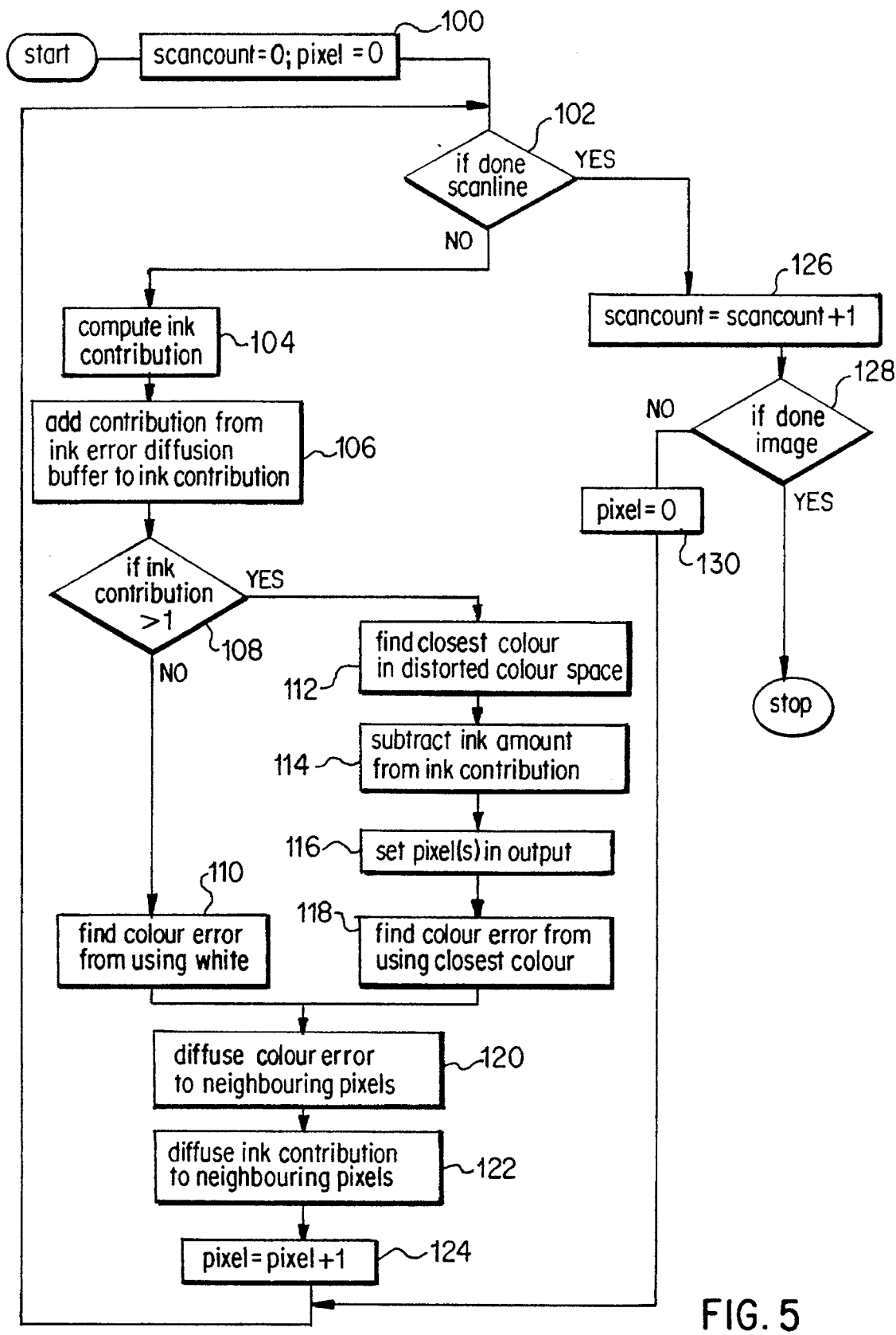
FIG. 5 shows a flow diagram for determining the pixels to be printed.

Referring to FIG. 5, a flow diagram for determining which color pixels to turn ON is shown. In step 100, the line counter (scancount) is set to zero and the pixel counter is set to zero.

In step 102, the pixel counter is checked to see whether all pixels have been printed. If all of the pixels in the scanline are printed, then step 126 is executed. The scancount is incremented by one. In step 128, the scancount is checked to see if all lines of the image page has been printed. If the image is completed, then the flow terminates. If the image is not complete, then the pixel counter is set to zero in step 130. Flow returns to step 102.

If there are more pixels to be printed in the scanline, then flow advances to step 104. Ink contribution is determined for the next pixel by separating the colors of the original pixel. Each color has a value of one.

The ink contribution is equal to three minus the value of each color needed:

$$\text{ink contribution}=3-\text{red}-\text{green}-\text{blue} \tag{1}$$

For example, if the pixel is red, the ink contribution is two ($3-1_{red}-0_{green}-0_{blue}=2$). If the pixel is magenta, then the ink contribution is one ($3-1_{red}-0_{green}-1_{blue}=1$). An alternative to equation (1) is to compute the ink contribution of cyan, magenta and yellow. Assign cyan as 1-red, magenta as 1-green, and yellow as 1-blue, and then add magenta, cyan, and yellow to give the ink contribution.

In step 106, the contribution from the ink error diffusion buffer is added to the computed ink contribution of step 104. The error diffusion method was previously described with reference to FIG. 4. The advantage of this method is that by taking the sum of the Cyan, Yellow and Magenta to determine the total amount of ink required for a particular dot, the total amount of ink of the set of colors for each dot is computed instead of merely performing color conversion. If a pixel has been set to a color and printed, the modified input value for that color (input plus error) will drop, making it unlikely for a second pixel of the color to be printed.

A decision is made in step 108 to determine if the ink contribution is greater than one. If the ink contribution is zero or one, then no color (white) will be printed. In step 110, the color error is determined when no color was selected. The diffused color error is then diffused to neighboring pixels in step 120. Step 122 diffuses the ink contribution to neighboring pixels. The pixel counter is incremented by one in step 124, and flow returns to step 102.

If the ink contribution is two or greater in step 108, then flow advances to step 112 to find the closest color in a distorted color space. To find the closest color the distance between the color required and each color in the color space is found. The following equations may be used to set the distances:

$$D_{cyan}=\|(\text{red},\text{green},\text{blue})-(-P_{cyan},1+P_{cyan},1+P_{cyan})\|$$

$$D_{magenta}=\|(\text{red},\text{green},\text{blue})-(1+P_{mag},-P_{mag},1+P_{mag})\|$$

$$D_{yellow}=\|(\text{red},\text{green},\text{blue})-(1+P_{yel},1+P_{yel},-P_{yel})\|$$

$$D_{black}=\|(\text{red},\text{green},\text{blue})-(-P_{blk},-P_{blk},-P_{blk})\|$$

$$D_{red}=\|(\text{red},\text{green},\text{blue})-(1+P_{red},-P_{red},-P_{red})\|$$

$$D_{green}=\|(\text{red},\text{green},\text{blue})-(-P_{grn},1+P_{grn},-P_{grn})\|$$

$$D_{blue}=\|(\text{red},\text{green},\text{blue})-(-P_{blue},-P_{blue},1+P_{blue})\|$$

$$D_{white}=\|(\text{red},\text{green},\text{blue})-(1+P_{wht},1+P_{wht},1+P_{wht})\|$$

where $D_{cyan}$ is the distance from cyan; and $P_{cyan}$ is the penalty associated with cyan.

Next, the minimum distance is determined:

$$\min(D_{cyan},D_{magenta},D_{yellow},D_{black},D_{red},D_{green},D_{blue},D_{white})$$

The closest color of the distorted color space has the minimum distance to that color.

In step 114, the ink amount is subtracted from the ink contribution. The pixels are set in the output bitmaps. If the closest color is either, cyan, magenta or yellow, then set the corresponding pixel with an ink amount of one. If the closest color is black, then set the corresponding pixel with the ink amount of three. If the closest color is white, then set the ink amount to zero. If the closest color is either red, green or blue, then set two corresponding pixels and the ink amount is two.

In step 116, the color of pixels that are turned ON are sent to the output. The color error is determined by using the closest color in step 118. Similar to before, the output from step 118 is used to diffuse color error to neighboring pixels in step 120. In step 122, the ink contribution error is diffused to neighboring pixels. The pixel count is incremented by one in step 124. Flow returns to step 102.

Referring to FIG. 6, a set-up for using the method is shown. A scanner 202 scans the original image. The original image is divided into sections, such as pixels, and each section is assigned a color from the continuous tone color image. The assigning of the colors is not limited to a scanner, but can be generated by any means.

The assigned colors are sent to a computer 204, which uses the method of the invention to generate the pixel colors with a relatively low contrast and increased spatial frequency.

The selected pixel colors are output to an output device such as a printer 206 or a monitor 208.

It should be noted that the distance measures used in the distortion of the color cube can be implemented in different ways. One such alternative implementation is to vary the threshold, i.e., the dividing line between different colors, in accordance with the desired attributes of the color space.

Although the invention has been described and illustrated with particularity, it is intended to be illustrative of preferred embodiments and understood that the present disclosure has been made by way of example only, and numerous changes in the combination and arrangements of the parts and features can be made by those skilled in the art without departing from the spirit and scope of the invention, as hereinafter claimed.

What is claimed is:

1. A method for determining a color of a pixel from an original image, comprising the steps of:

determining an ink contribution of the pixel based on input data derived from the original image and a diffused ink error contribution;

selecting the color of the pixel based on a distorted multi-dimensional color space, the determined ink contribution of the pixel, and a diffused color error;

updating the diffused ink error contribution and the diffused color error based on the selected color of the pixel; and setting the selected color of the pixel in an output bitmap representing the original image.

2. The method of claim 1, wherein the input data used for determining the ink contribution uses the following equation:

(Ink Amount)input data=3−red−green−blue.

3. The method of claim 1, wherein the input data used for determining the ink contribution uses the following equation:

(Ink Amount)input data=cyan+magenta+yellow.

4. The method of claim 1, wherein the diffused ink error contribution and the diffused color error are derived from a color selected for at least one neighboring pixel.

5. The method of claim 4, wherein any of said at least one neighboring pixel precedes a current pixel along a line of the original image.

6. The method of claim 4, wherein the diffused ink error contribution is based on an ink amount associated with the selected color subtracted from the determined ink contribution.

7. The method of claim 6, wherein the ink amount associated with the selected color equals one of the following: zero if the selected color is white; one if the selected color is one of cyan, magenta and yellow, and the color requires setting a pixel in one separation; two if the closest color is one of red, green and blue, and the color requires setting a pixel in two separations; and three if the closest color is black.

8. The method of claim 6, wherein the ink amount equals one of the following: zero if the closest color is black; one if the closest color is one of red, green and blue, and the color requires setting a pixel in one separation; two if the closest color is one of cyan, magenta and yellow, and the color the color requires setting a pixel in two separations; and three if the closest color is white.

9. The method of claim 1, wherein the step of selecting the color based on the distorted color space is by determining a smallest distance between a color representing the input data and each of the ink colors in the distorted space by using the following equations:

$$D_{cyan}=\|(red,green,blue)-(-P_{cyan},1+P_{cyan},1+P_{cyan})\|$$

$$D_{magenta}=\|(red,green,blue)-(1+P_{mag},-P_{mag},1+P_{mag})\|$$

$$D_{yellow}=\|(red,green,blue)-(1+P_{yel},1+P_{yel},-P_{yel})\|$$

$$D_{black}=\|(red,green,blue)-(-P_{blk},-P_{blk},-P_{blk})\|$$

$$D_{red}=\|(red,green,blue)-(1+P_{red},-P_{red},-P_{red})\|$$

$$D_{green}=\|(red,green,blue)-(-P_{grn},1+P_{grn},-P_{grn})\|$$

$$D_{blue}=\|(red,green,blue)-(-P_{blue},-P_{blue},1+P_{blue})\|$$

$$D_{white}=\|(red,green,blue)-(1+P_{wht},1-P_{wht},1+P_{wht})\|$$

where, for example, $D_{cyan}$ an is the distance between the color representing the input data and cyan; and $P_{cyan}$ is a predetermined penalty associated with cyan.

10. The method of claim 9, wherein the penalty associated with a specific ink color is based on a reduction in luminance.

11. The method of claim 10, wherein the penalty for each separate ink color is assigned as follows:

$$P_{cyan} = P_{magenta} = P_{red} = P_{green} < P_{white} = P_{yellow} = P_{blue} = P_{black}.$$

12. The method of claim 9, wherein the penalty associated with a specific ink color is based on maintaining an average ink coverage.

13. The method of claim 12, wherein the penalty for each separate ink color is assigned as follows:

$$P_{cyan} = P_{magenta} = P_{yellow} < P_{white} = P_{red} = P_{green} = P_{blue} < P_{black}.$$

14. The method of claim 1, wherein the step of selecting the color of the pixel is partially based on comparing the determined ink contribution to a predetermined value such that:

when the determined ink contribution is below the predetermined value, no color is selected; and when the determined ink contribution is above the predetermined value, the closest color in distorted space is selected.

15. The method of claim 1, wherein the output bitmap is used in a printer.

16. The method of claim 15, wherein the printer is a color printer.

17. The method of claim 1, wherein the output bitmap is used in a monitor.

18. The method of claim 17, wherein the monitor is a color monitor.

19. A method for determining a color of a pixel from an original image, comprising the steps of:
computing the ink contribution based on input data derived from the original image;
modifying the computed ink contribution by adding a predetermined diffused ink contribution;
comparing the modified ink contribution to a predetermined value;
selecting the color of the pixel based on a closest color in a distorted color space when the modified ink contribution is above the predetermined value, and selecting no color when the modified ink contribution is below the predetermined value;
diffusing the color error to neighboring pixels after calculating the color error, the color error being based on one of the selected color and no color selected;
diffusing ink contribution to neighboring pixels after subtracting an ink amount from ink contribution; and
setting the selected color of the pixel in an output bitmap representing the original image.

20. The method of claim 19, wherein the step of calculating the ink contribution uses the following equation:

Ink contribution=3−red−green−blue.

21. The method of claim 19, wherein the step of calculating the ink contribution uses the following equation:

Ink contribution=cyan+magenta+yellow.

22. The method of claim 19, wherein the ink amount equals one of the following: zero if the closest color is white; one if the closest color is one of cyan, magenta and yellow, and the color requires setting one pixel; two if the closest color is one of red, green and blue, and the color requires setting two pixels; and three if the closest color is black.

23. The method of claim 19, wherein the ink amount equals one of the following: zero if the closest color is white; one if the closest color is one of red, green and blue, and the color requires setting one pixel; two if the closest color is one of cyan, magenta and yellow, and the color the color requires setting two pixels; and three if the closest color is black.

24. The method of claim 19, wherein the step of selecting the color based on the distorted color space is by determining a smallest distance between a color representing the input data and each of the ink colors in the distorted space by using the following equations:

$D_{cyan} = \|(red, green, blue) - (-P_{cyan}, 1+P_{cyan}, 1+P_{cyan})\|$ $D_{magenta} = \|(red, green, blue) - (1+P_{mag}, -P_{mag}, 1+P_{mag})\|$ $D_{yellow} = \|(red, green, blue) - (1+P_{yel}, 1+P_{yel}, -P_{yel})\|$ $D_{black} = \|(red, green, blue) - (-P_{blk}, -P_{blk}, -P_{blk})\|$ $D_{red} = \|(red, green, blue) - (1+P_{red}, -P_{red}, -P_{red})\|$ $D_{green} = \|(red, green, blue) - (-P_{grn}, 1+P_{grn}, -P_{grn})\|$ $D_{blue} = \|(red, green, blue) - (-P_{blue}, -P_{blue}, 1+P_{blue})\|$ $D_{white} = \|(red, green, blue) - (1+P_{wht}, 1+P_{wht}, 1+P_{wht})\|$ where, for example, $D_{cyan}$ is the distance between the color representing the input data and cyan; and $P_{cyan}$ is a predetermined penalty associated with cyan.

25. The method of claim 24, wherein the penalty associated with a specific ink color is based on a reduction in luminance.

26. The method of claim 25, wherein the penalty for each separate ink color is assigned as follows:

$P_{cyan} = P_{magenta} = P_{red} = P_{green} < P_{white} = P_{yellow} = P_{blue} = P_{black}.$ 27. The method of claim 24, wherein the penalty associated with a specific ink color is based on maintaining an average ink coverage.

28. The method of claim 27, wherein the penalty for each separate ink color is assigned as follows:

$P_{cyan} = P_{magenta} = P_{yellow} < P_{white} = P_{red} = P_{green} = P_{blue} < P_{black}.$ 29. The method of claim 19, wherein the output bitmap is used in a printer.

30. The method of claim 19, wherein the output bitmap is used in a monitor.

31. The method of claim 19, wherein the step of calculating the ink contribution uses the following equation:

Ind contribution=red+green+blue.

32. An apparatus for determining colors of a plurality of pixels based on an original image, the apparatus comprising:
a scanner for scanning the original image and forming input data representing an actual color;
a computer for determining the color of the plurality of pixels, the computer including:
a determinator for determining an ink contribution of the pixel based on the input data and a diffused ink error contribution;
a selector for selecting the color of the pixel based on a distorted color space, the determined ink contribution of the pixel, and a diffused color error;
an updater for updating the diffused ink error contribution and the diffused color error based on the selected color of the pixel; and
a designator for setting the selected color of the pixel in an output bitmap representing the original image;
a printer for formatting the output bitmap data.

* * * * *